(12) United States Patent
Zhou et al.

(10) Patent No.: US 9,323,038 B2
(45) Date of Patent: Apr. 26, 2016

(54) MATCHING OBJECT GEOMETRY WITH ARRAY MICROSCOPE GEOMETRY

(71) Applicant: DMetrix, Inc., Tucson, AZ (US)

(72) Inventors: Pixuan Zhou, Tucson, AZ (US); Chen Liang, Tucson, AZ (US)

(73) Assignee: DMetrix, Inc., Tucson, AZ (US)

( * ) Notice: Subject to any disclaimer, the term of this patent is extended or adjusted under 35 U.S.C. 154(b) by 282 days.

(21) Appl. No.: 14/031,340

(22) Filed: Sep. 19, 2013

(65) Prior Publication Data

US 2014/0118527 A1 May 1, 2014

Related U.S. Application Data

(63) Continuation-in-part of application No. 13/799,068, filed on Mar. 13, 2013, and a continuation-in-part of application No. 13/803,936, filed on Mar. 14, 2013, now Pat. No. 9,030,548.

(60) Provisional application No. 61/719,432, filed on Oct. 28, 2012.

(51) Int. Cl.
G02B 21/26 (2006.01)
G02B 21/00 (2006.01)
G02B 21/36 (2006.01)

(52) U.S. Cl.
CPC .............. *G02B 21/26* (2013.01); *G02B 21/367* (2013.01)

(58) Field of Classification Search
None
See application file for complete search history.

(56) References Cited

U.S. PATENT DOCUMENTS

| | | | | |
|---|---|---|---|---|
| 6,320,174 B1* | 11/2001 | Tafas | ............... | G02B 6/06 250/208.1 |
| 7,061,584 B2* | 6/2006 | Olszak | ............... | G02B 3/0056 355/53 |
| 2004/0004176 A1* | 1/2004 | Liang | ............... | G02B 21/06 250/208.1 |
| 2004/0004759 A1* | 1/2004 | Olszak | ............... | G01N 21/253 359/373 |
| 2004/0051940 A1* | 3/2004 | Liang | ............... | G02B 21/241 359/368 |
| 2004/0057094 A1* | 3/2004 | Olszak | ............... | G02B 21/367 359/198.1 |
| 2004/0095641 A1* | 5/2004 | Russum | ............... | G02B 21/26 359/391 |
| 2004/0101210 A1* | 5/2004 | Weinstein | ............... | G02B 21/36 382/284 |
| 2004/0113050 A1* | 6/2004 | Olszak | ............... | G02B 21/002 250/208.1 |
| 2007/0153370 A1* | 7/2007 | Olszak | ............... | G01J 3/02 359/368 |
| 2007/0253057 A1* | 11/2007 | Potsaid | ............... | G02B 21/0048 359/384 |
| 2008/0095467 A1* | 4/2008 | Olszak | ............... | G02B 21/002 382/284 |
| 2008/0240613 A1* | 10/2008 | Dietz | ............... | G02B 21/365 382/284 |
| 2012/0208184 A1* | 8/2012 | Ragan | ............... | G01N 1/06 435/6.11 |
| 2012/0250032 A1* | 10/2012 | Wilde | ............... | G01B 9/02047 356/521 |

* cited by examiner

*Primary Examiner* — Jay Patel
*Assistant Examiner* — Reza Aghevli
(74) *Attorney, Agent, or Firm* — Yakov Sidorin; Quarles & Brady, LLP (57) ABSTRACT

A method for object preparation for imaging with an array microscope system without scanning. Artifact-free image is formed based on scanning-free imaging of an object array formed from spatially-separated portions of the initially spatially-continuous object that are arranged, in the object plane of the array microscope, in a pattern associated with an array of individual objectives of the array microscope. The size of an individual portion of the object does not exceed the size of a FOV of the individual objective defined in the object plane.

9 Claims, 10 Drawing Sheets

MATCHING OBJECT GEOMETRY WITH ARRAY MICROSCOPE GEOMETRY

CROSS-REFERENCE TO RELATED APPLICATIONS

This application claims the benefit of and priority from the U.S. Provisional Patent Application No. 61/719,432 filed on Oct. 28, 2012 and titled "Matching Object Geometry with Array Microscope Geometry". The present application is a continuation-in-part of the U.S. patent application Ser. No. 13/799,068 titled "Manipulation of Topography of Large-Format Glass Slides" and filed on Mar. 13, 2013. The present application is also a continuation-in-part of the U.S. patent application Ser. No. 13/803,936 titled "Correction of a Field-of-View Overlay in a Multi-Axis Projection Imaging System" and filed on Mar. 14, 2013. The entire disclosure of each of the above-mentioned patent applications is hereby incorporated by reference for all purposes.

TECHNICAL FIELD

The present invention relates to a light microscopy. More specifically, this invention relates to imaging of an object with a multi-axis imaging system, particularly an array of imaging systems.

BACKGROUND ART

A multi-axis imaging system employing an array of optical imaging elements is a recent development. Related U.S. Patent Application No. 60/276,498; International Patent Application No. PCT/US02/08286; and U.S. Pat. No. 7,061,584, for example, disclose novel method and apparatus for rapidly obtaining an image of an entire slide using an array microscope. In general, this is a multiple-optical-axis, or multi-axis, imaging system having a plurality of imaging elements arranged in an array, each imaging element having one or more optical elements disposed along the optical axis of the array. Where the imaging elements are microscopes, the system is referred to as an Array Microscope (AM), or miniature microscope array (MMA) since the imaging elements are preferably very small.

In a multi-axis imaging system such as an MMA, where the imaging elements are closely packed, constructing a composite image of the entire object that is uniform and artifact-free from images formed by individual objectives remains problematic. In particular, to ensure that every region of the object is imaged, during the scanning operation of the multi-axis MMA, with at least one of the objectives of the objective array of the MMA, these objectives are arranged in a redundant spatial fashion. In particular, the objectives are placed in such a spatial pattern that results in overlapping, in the object plane, of traces across the object of at least some of the fields-of-view (FOVs) of at least some of the objectives. For the purposes of this disclosure, the FOV of an individual imaging system in an object space is defined as the projection of an image-plane sensor or a segment of an image-plane sensor (detector) associated with the individual imaging system into the object space, for example onto an object plane that is conjugate to the image plane where the image plane detector is located. As a result of the spatial overlapping, in the image plane, of the traces of at least some of the FOVs in the object plane (such overlapping caused by the process of scanning of the AM system), an initial image formed by the array of objectives includes image portions that contain images of the same object region but by different objectives.

While processing of the imaging data, received from so spatially organized objectives and judiciously chosen data normalization and/or calibration (disclosed, for example, in the U.S. patent application Ser. No. 13/803,936) enable the user to create a substantially artifact-free final composite image that is devoid of spatially overlapping portions of the image produced by different objectives, there remains a spatial limitation on how closely to one another the neighboring objective in the AM can packed caused by the size of the image. Such spatial limitation increases not only the complexity of the AM system but also increases the time needed to perform the process of imaging an object. Accordingly, in a situation where the hardware constraints impose practical limitations on the scanning operation of the AM, there remains a need to eliminate or at least reduce the amount of scanning.

SUMMARY OF THE INVENTION

Embodiments of the invention provide a method for imaging an object with an array microscope system. Such method includes positioning individual object portions, which have been formed from said object, in an object plane of said array microscope system in a pattern defined by an array of objectives of said microscope system. The method further includes procuring an artifact-free image of said individual object portions with the array microscope system in a single snapshot and, optionally, without scanning. The maximum dimension of each individual object portion not exceeding a dimension of a FOV of an individual objective of the array microscope in the object plane. The step of positioning includes forming an array of individual object portions from a spatially-continuous biological tissue, and may include positioning so formed individual object portions in a pattern defined, in an object plane of the array microscope, by at least one of (i) a spatial grid that the array of objectives forms in the array microscope; and (ii) magnification of the objectives of the array microscope. In one embodiment, the step of positioning includes positioning the array of individual object portions within individual wells of a well-plate into an individual object portion. Embodiments of the invention further include a method for imaging an object with an array microscope system. The method comprises (i) procuring first data representing parameters of an object array; and (ii) forming the object array from the object according to the procured first data. The method may further include a step of acquiring, with a data-processing computer circuitry, second data representing opto-geometrical parameters of the array microscope, while the step of procuring includes generating the first data based at least in part on the acquired second data. The acquiring may be effectuated via a device configured to accept he user input or by accessing a tangible, non-transitory storage medium containing the required data. The step of procuring may include determining at least one of a spacing between two immediately adjacent elements of the object array and a geometrical size of an individual element of the object array.

The step of acquiring includes acquiring of second data that include at least one of (i) a geometrical dimension of a field of view (FOV) of an individual objective of the array microscope system defined in an object plane of said array microscope system; and (ii) a descriptor of a pattern formed by the FOVs of individual objectives of the array microscope system in said object plane. The step of forming may include forming individual spatially-distinct object portions from a spatially-continuous object, each of the individual object portions having a maximum dimension that does not exceed a field of view (FOV) of an individual objective of the array microscope system defined in an object plane of the array microscope system.

Embodiments of the invention further provide an article of manufacture for use with an array microscope system. The article contains a data-processing computer circuitry; and a tangible, non-transitory storage medium including program code thereon. Program code, when uploaded to the data-processing computer circuitry, enables the circuitry to: (i) acquire first data representing opto-geometrical parameters of the array microscope system; (ii) generate, based at least in part on the acquired first data, second data representing parameters of an object array; and (iii) activate the array microscope system to procure an artifact-free image of the object array without scanning. The first data represents opto-geometrical parameters of the array microscope and includes at least one of a geometrical dimension of a field of view (FOV) of an individual objective of the array microscope system as defined in an object plane of said array microscope; and a descriptor of a pattern formed by the FOVs of individual objectives of the array microscope system in said object plane. Each of the spatially-distinct individual object portions are so separated from the initial object as to have a maximum dimension that is less than a field of view (FOV) of an individual objective of the array microscope defined in an object plane of the array microscope.

BRIEF DESCRIPTION OF THE DRAWINGS

The invention will be more fully understood by referring to the following Detailed Description in conjunction with the Drawings, of which.

DETAILED DESCRIPTION

A microscope is used to generate a magnified image of an object. The resolution of a well-designed microscope objective is limited by diffraction. Traditionally, in the process of designing a microscope objective, there is a trade-off to be made between the size of field-of-view (FOV) and the achievable optical resolution. It is difficult both to achieve high resolution and to maintain a large FOV. As a result of such practical limitation, it is challenging to design a microscope system that can image objects having large spatial format or dimensions at high resolution. The invention of an Array Microscope provided the solution to the long-felt need to circumvent of the above-discussed resolution-versus-FOV trade-off. An Array Microscope (AM) includes multiple individual microscope objectives that are closely packed together. While each individual objective is subject to the same resolution-vs.-FOV design tradeoff (and, therefore, only has a limited corresponding FOV), the combined FOV of the entire array of the objectives used in the AM can be arbitrarily large limited, for practical purposes, only by the physical size of the array. As such, an Array Microscope achieves both large FOV and high-resolution of optical imaging by defining an optical conjugate of the object being image with the parallel use of multiple optical channels defined by small, individual FOVs of individual objectives.

Figure 1:
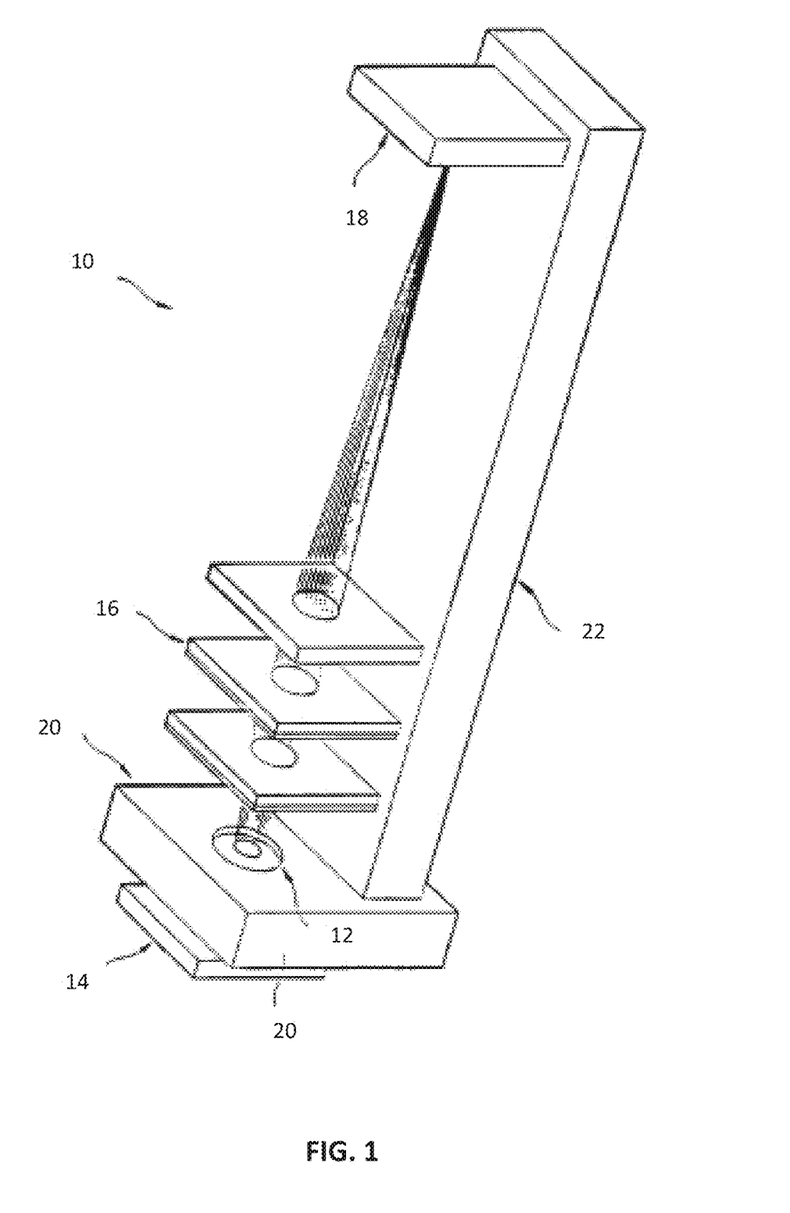
FIG. 1 is a diagram depicting a single miniaturized microscope in an AM.

The AM according to an embodiment of the present invention includes an array of miniaturized microscopes (each of which has a corresponding individual microscope objective) such that the AM is configured to scan a width of a microscope slide containing an object (for example, a pathological specimen). While the discussion below refers to a specific example of the AM, it is understood that the present invention can be implemented with any type of the array microscope of the related art. Referring now to the drawings, wherein like reference numerals designate identical or corresponding parts throughout the several views, FIG. 1 shows a schematic of an individual miniaturized microscope 10. In context of the present disclosure, the term "microscope" is used with reference to both the array microscope and the individualized microscope component of the AM that employs an individual microscope objective, and it is assumed that the distinction will be apparent to those skilled in the art from the context of the description. Each microscope 10 includes an objective or objective lens 12 adjacent to a cover plate 14, an image sensor portion 18, and optionally at least one refractive plate 16. (Qualitatively, the use of multiple refractive plates 16 increases the field of view and improves image quality of each microscope 10.) A specimen (i.e., the object to be imaged) is located beneath the cover plate 14. In addition, the objective lens 12 and at least one additional optical element (for example, a refractive plate 16) function together as one optical system, designed to control aberrations.

The objective lens 12 may be held by a base plate or substrate 20. Trans-illumination of the object across the field of view or epi-illumination peripheral to the field of view along the base plate 20 illuminates the object for each miniaturized microscope. As shown in FIG. 1, a micro-optical table 22 (MOT) serves as a support for each microscope. The MOT 22 supports the base plate 20, the optional refractive plates 16, and the image sensor 18. Optical elements such as for example lenses, fiber optics, mirrors, and detectors can be mounted on the base plate 20.

The number of miniaturized microscopes needed to cover an entire width of a microscope slide depends on the ratio of microscope-slide width (e.g., a microscope slide width of 20 mm) to the FOV diameter of each microscope imaging system in the array. A smaller ratio requires fewer microscopes in the array. A typical FOV for an individual microscope is on the order of 200 microns in diameter. As a result, in this example, approximately 100 miniature microscopes are needed to image a microscope slide with a width of 20 mm.

Figure 2A:
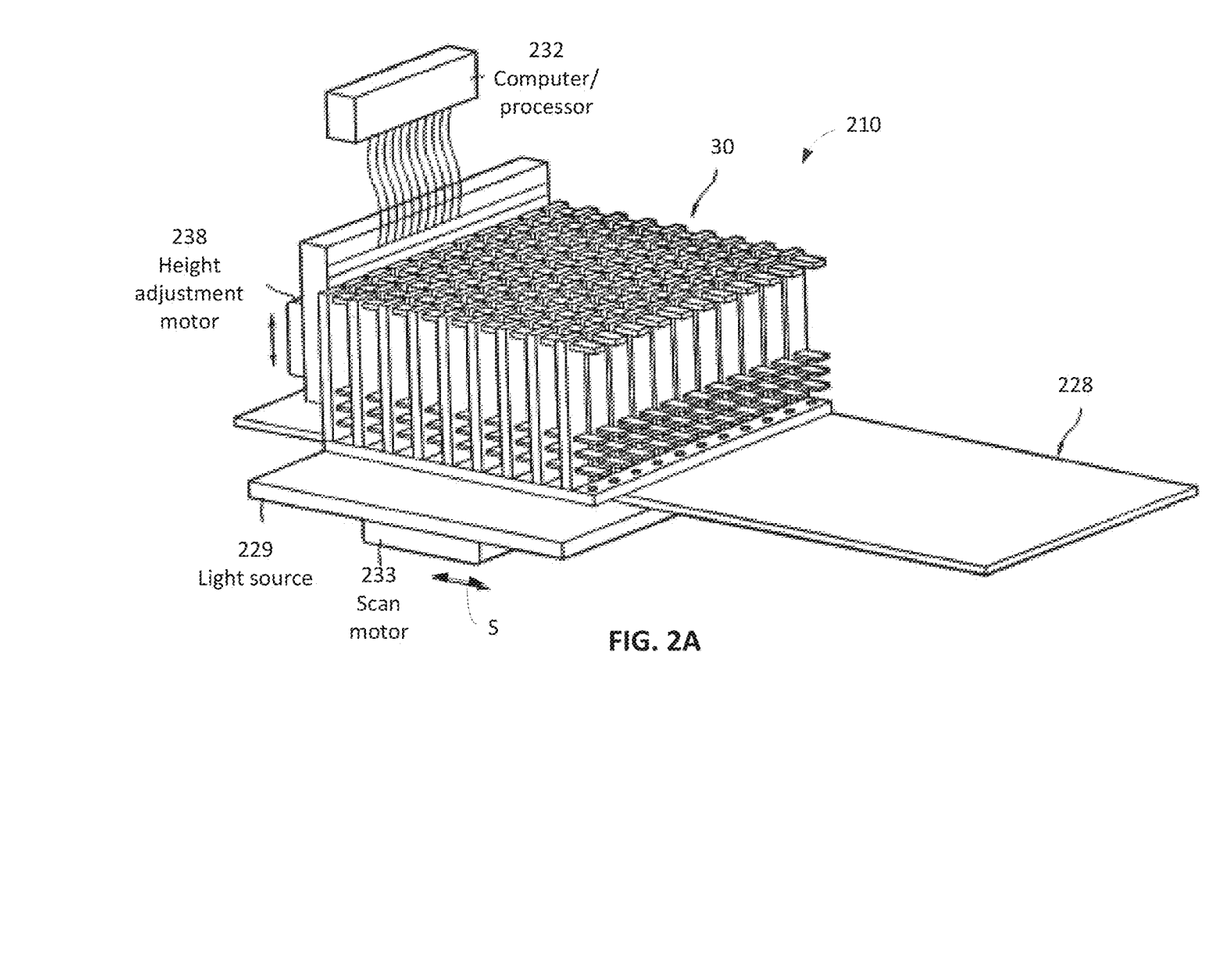
FIG. 2A is an isometric view of an AM containing an array of multiple miniaturized microscopes.
Figure 2B:
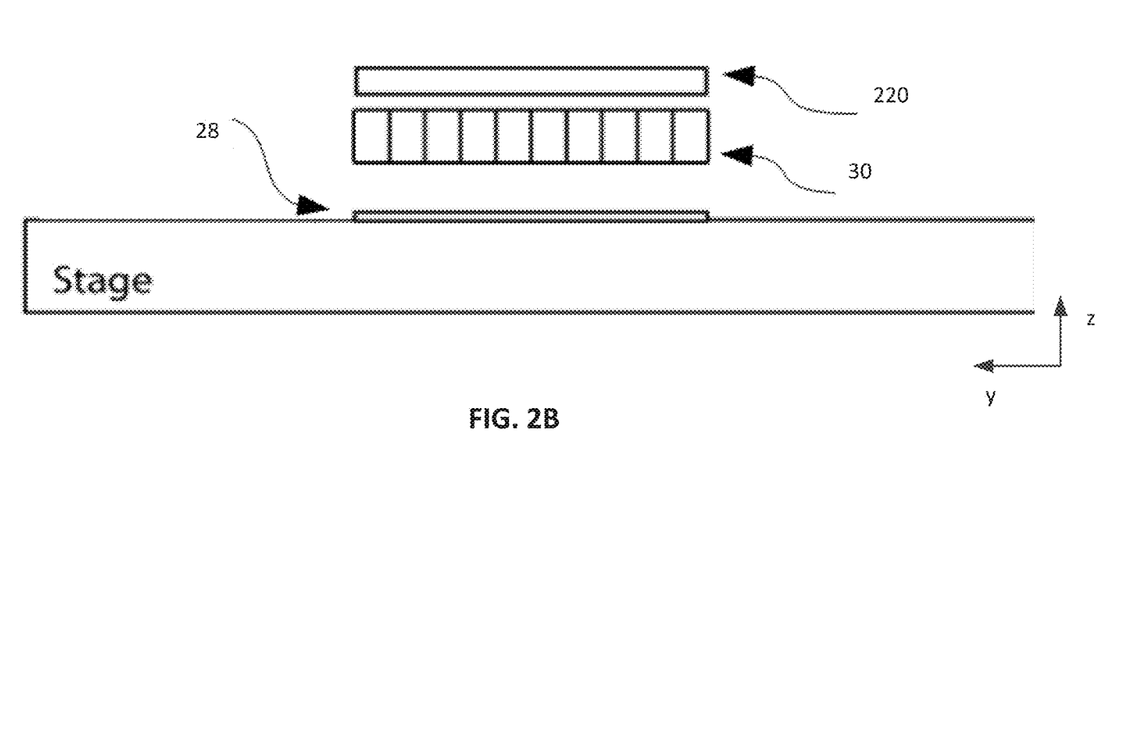
FIG. 2B is a simplified side view of the embodiment of FIG. 2A.

An embodiment of the AM depicted in FIG. 2A shows a completed AM 30 with a spacing between adjacent microscopes on the order of 2 mm. The AM 30, as shown in FIG. 2A to be part of the automated microscope system 210, scans via a scan motor 233 longitudinally, in S-direction, across the slide 228 imaging the object on the microscope slide 228. Alternatively, the scan motor 233 could move the slide 228 under a stationary AM. The scanning motion may be continuous or the scanning motion may be step-and-image, in which case the microscope slide 228 is advanced in steps less than or equal to the FOV diameter of an individual microscope 10, an image is recorded, and the next step is taken. A light source 229 trans-illuminates or epi-illuminates the object on the slide. For epi-illumination, light can be transmitted to the object by light guides on the base plate 20 holding the objective lens 12. For completeness of illustration, FIG. 2B shows schematically mutual orientation of some of the components of the AM 30 of FIG. 1 in side view. The object under the microscope slide is to be imaged with the AM 30 onto a detector array 220, juxtaposed with the data acquisition board (not shown).

Figure 3:
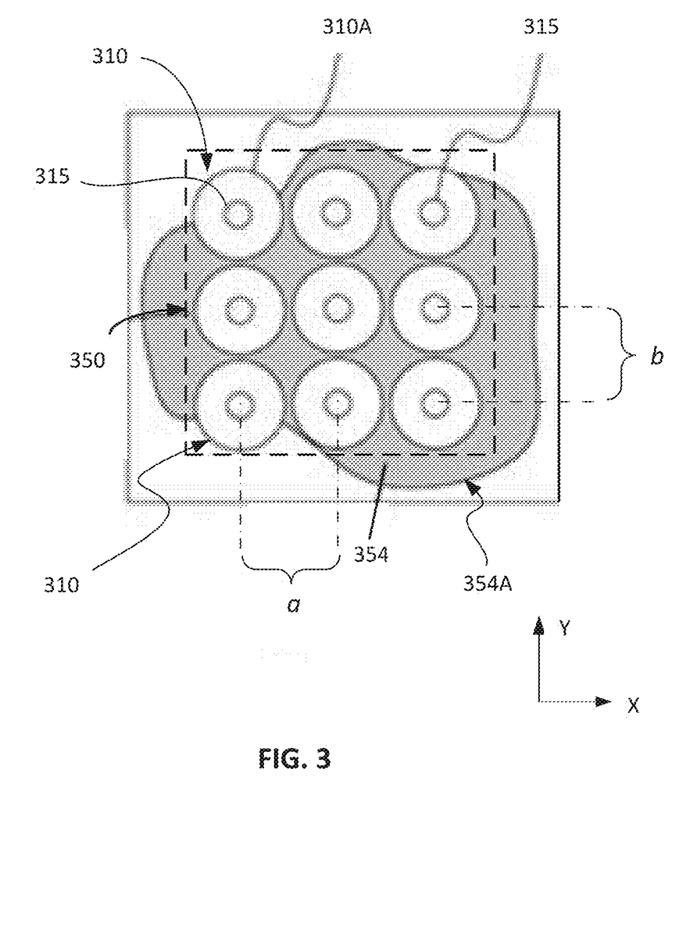
FIG. 3 is a diagram showing a projection of a rectangular array of nine individual objective/microscopes of an embodiment of the AM on an object plane containing a spatially-continuous object.

In general, in an Array Microscope the individual FOVs corresponding to different objectives are not physically connected, and there are gaps in between. This is because, by the very nature of the microscope, for an individual microscope objective the image is always larger than the object by the factor of it's transverse magnification, and neighboring objectives need to be positioned at a separation, with respect to one another, that is sufficient to avoid an overlap of the corresponding FOVs in the object plane. Therefore, in an Array Microscope, the image size often limits how closely the neighboring objectives can be packed. The physical diameter of the optics is typically comparable to or smaller than the diameter of the image. FIG. 3 shows an example of a projection of individual objectives 310 (with the corresponding outer diameters shown as 310A) and respectively-corresponding FOVs 315 of an Array Microscope 350 onto the plane of and overlaid with the object 354 having a boundary 354A. This specific embodiment of the Array Microscope 350 is shown to include nine individual objectives spatially organized in a 3×3 rectangular grid. In order to image a continuous object, an Array Microscope has to perform scanning, the format of which generally depends on the Array Microscope geometry. For example, for the Array Microscope 350 of FIG. 3, scanning of the object 354 in two directions is required to image the entire object 354 without any missing sections. In another example (not shown), the array microscope system DX-40 (by DMetrix, Inc.) that employs an array of 80 objectives arranged in a staggered hexagonal array, can image a standard microscope slide with a single pass scan.

As was already alluded to above, the implementation of a particular scanning strategy requires the use of precision stages, control electronics, and image stitching software. It increases the complexity and the cost of an Array Microscope system. It also increases the time needed to perform the imaging. To maximize the advantage of an array microscope system, eliminating or at least reducing the amount of scanning is desired.

References throughout this specification have been made to "one embodiment," "an embodiment," "a related embodiment," or similar language. Such references mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same implementation of the inventive concept. It is to be understood that no portion of disclosure, taken on its own and in possible connection with a figure, is intended to provide a complete description of all features of the invention.

It is to be understood that no single drawing used in describing embodiments of the invention is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

The invention as recited in claims appended to this disclosure is intended to be assessed in light of the disclosure as a whole, including features disclosed in prior art to which reference is made.

A typical object (such as, for example, a section of a biological tissue) imaged by a conventional individual microscope is shaped arbitrarily, without any particular regularity. There is little if any advantage to generate a tissue section characterized by any specific size or shape when it is imaged using conventional microscopes. In comparison, embodiments of the present invention take advantage of the arrayed-nature of an AM system to form an Array Microscope-specific object, to be imaged with the AM system, the size and shape of which are judiciously defined to spatially match the geometry and opto-geometrical characteristics of the AM system. In other words, an object array is formed that includes individual, spatially-separated object portions formed from the initial, optionally spatially-continuous object.

Figure 4:
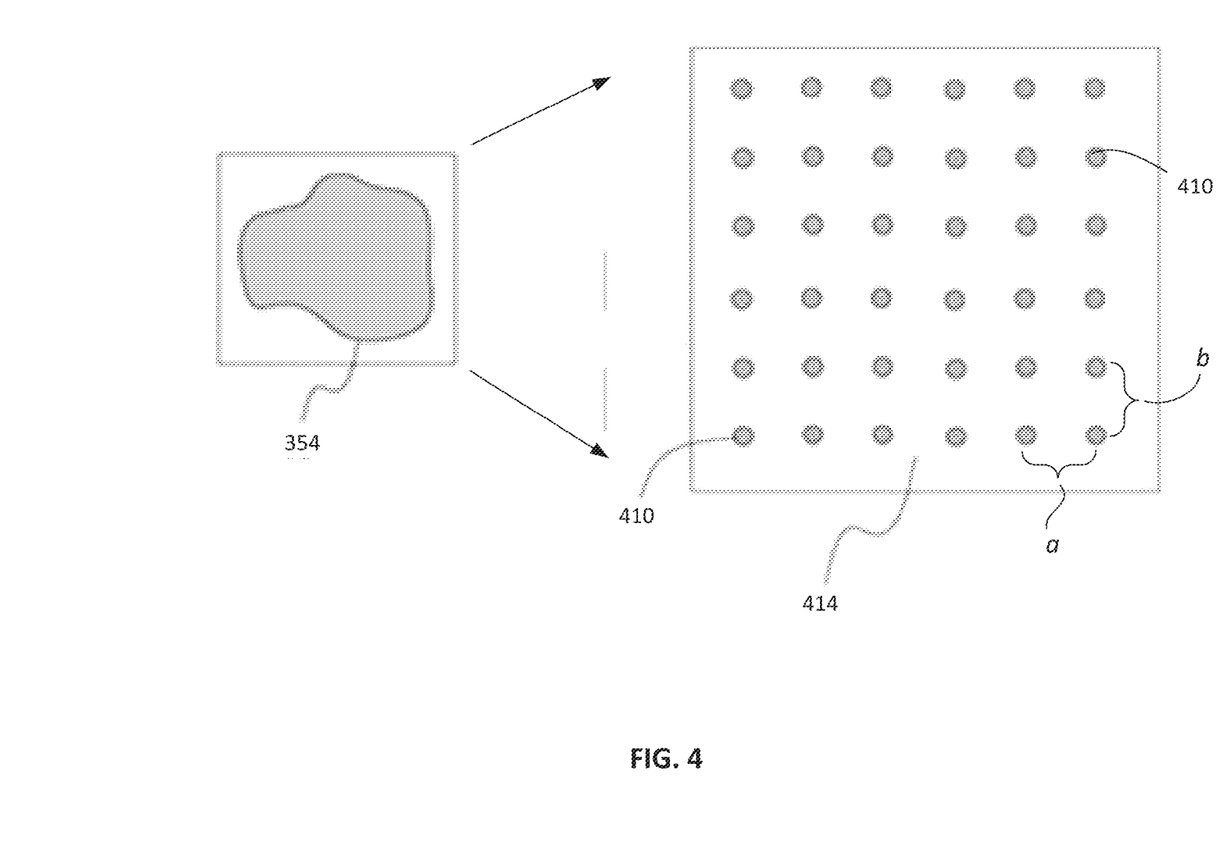
FIG. 4 is a diagram illustrating an initial, spatially-continuous object and an objet array formed from such object according to an embodiment of the invention.

The concept of the invention is graphically illustrated in FIG. 4. Here, the initially randomly shaped and continuous object 354 is divided up into Individual Object Bits or Individual Object Portions 410 used to form an Object Array 414. Individual object portions are sized to match the size of the individual FOV corresponding to an individual objective of the Array Microscope system used for imaging and spaced to match the spacing(s) between optical axes of the neighboring individual objectives of the AM. For example, the size of an Individual Object Portion 410 can be made to match or at least not to exceed the size of the Individual FOV 315 corresponding to an Individual Objective 310 of the Array Microscope system (not shown) that is similar to the AM 350 of FIG. 3 but that contains a rectangular 6×6 array of individual objectives. In addition, as shown in FIG. 4, the Object Array 414 is formed by Individual Object Portions 410 positioned in a grid pattern that is congruent with the pattern according to which the individual objectives of the AM 350 of FIG. 3 are organized. As a result, the geometry of the Object Array 414, in terms of spacing between Individual Objects 410, is matched to the geometry of the Array Microscope 350. This type of Object Array can be imaged by an Array Microscope having a rectangular 6×6 array of objectives of in one snapshot; so no scanning of such AM system would be required. In practice, to match the clear aperture of a typical electronic image sensor used with the AM system of the invention, an Individual Object 410 can be circularly shaped as shown in FIG. 4. Generally, however, it can be shaped arbitrarily as long as its outmost dimension does not exceed that defined by an Individual FOV 315 of an Individual Objective 310. For many practical applications (such as histology, for example), the process of division of one large object into an array of smaller objects does not impact the usefulness of the final image. This is because most of tissue sections or slices mostly contain the tissue of the same type, and the diagnostic information is based on cell or sub-cell features that have dimensions on the order of a micro or eve sub-micron, which is significantly smaller than the size of an individual object portion. Therefore, as long as a sufficiently large area of the object is examined, the practically useful diagnostic information acquired from the examination of an individual object portion unexpectedly does not differ from the diagnostic information acquired from the examination of a bigger, continuous object. As a unexpected advantageous result (over the imaging effectuated with the use of the scanning of the AM), therefore, there is no need to stitch individual images of Individual Object Portions 410 acquired by Individual Objectives 310 to form an overall, continuous image of the object field defined by the Object Array 414. This unexpected realization substantially simplifies the process of the invention as compared to a conventional process of imaging with the AM that requires such stitching to procure error free diagnostic information about the object. The Object Array generally does not have to be patterned as a rectangular grid. The Array can include a circular grid or an Array of any other pattern as long as it matches the geometry of spatial positioning of the objectives (and corresponding FOVs) of the Array Microscope.

Formation of an Object Array from initial, continuous Individual Object into an Object Array and matching the Object Array geometry with the geometry of an Array Microscope geometry can be implemented with many types of microscope objects. For example, the object can be a biological tissue used in a pathology study. Instead of a using a standard size section of the tissue on a standard size glass slide (or, alternatively or in addition, another object-carrying substrate or holder), the tissue section is divided, according to an embodiment of the invention, into multiple smaller sub-sections and deposited over a large glass slide in a grid pattern to form the Object Array to match that of an Array Microscope.

Figure 5:
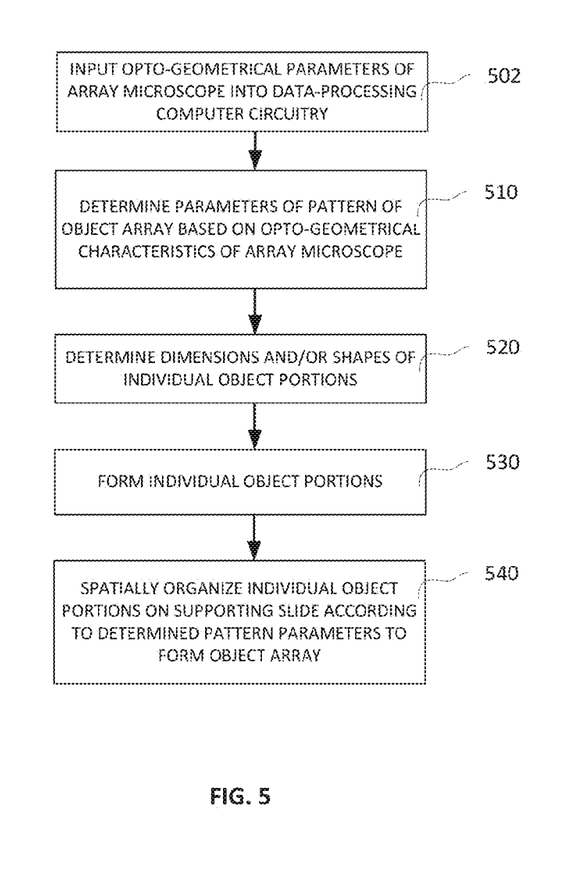
FIG. 5 is a flow-chart illustrating an embodiment of the method of the invention.

According to an embodiment of the method of the invention, shown schematically in FIG. 5, input parameters representing at least the mutual positioning, orientation, and optical characteristics of the objectives of the AM are received, through an input unit of the system, by the data-processing computer circuitry. The data-processing computer circuitry (which may alternatively be referred to herein as a computer processor or simply processor) is programmable with and governed by specific instructions stored in a tangible, non-transitory memory such as to specifically enable the desired operation of these elements and/or system and/or to effectuate the flow of the process of the invention including as discussed in this disclosure. The term data-processing computer circuitry (as well as the terms computer processor and processor) are used herein as they are used in common parlance and/or by a person of skill in the pertinent art to designate a structural arrangement of the components of electronic circuitry. The general purpose data-processing computer circuitry (such as a commercially available off-the-shelf processor) is known by a person of skill in the art to enable functions of processing, receiving, and storing without special programming. In addition, the data-processing computer circuitry of the invention is specifically programmed, as will be understood by a person of ordinary skill in the art, to transform a general purpose processor into a special purpose processor to perform specific steps of the algorithm of the invention further described below.

Referring further to FIG. 5, the determination of parameters of a pattern corresponding to the pattern of the areas defined by the FOVs of the objectives of an AM is made at step 510. Such determination is carried out at least partly on the basis of the opto-geometrical parameters of the AM received at step 502 and including, for example and in reference to FIG. 3, (i) type and/or symmetry of pattern or grid defined by the array of objectives 310 (rectangular, circular, etc); (ii) parameters of mutual geometrical positioning of the objectives 310 (center-to-center or axis-to-axis distances); (iii) magnification(s) of objectives comprising the AM; and (iv) working distance at which the AM is intended to operate with respect to the object or sample being imaged. Similarly, and in reference to FIG. 4, the maximum dimensions of Individual Object Portions 410 are determined at step 520 based on the calculation of the individual FOVs corresponding to the objectives of the AM. For example, assuming that an Individual Object Portion 410 is shaped as a rectangle, the maximum extent of the diagonal of such rectangle should not exceed a diameter of the FOV defined by an objective 310 in the object plane during the imaging of the sample under normal operating conditions of the AM.

At step 530, the Individual Object Portions are formed by being cut out of the initially prepared object or sample such as a biological tissue (or, alternatively, the initially prepared Individual Object is cut into Individual Object Portions) with a use of an appropriate cutting tool (referred to herein as a cutter) that includes knives or blade(s) the shape(s) of which is/are judiciously defined to represent the pre-determined shape of Individual Object Portions. In one embodiment, where all of the numerous Individual Object Portions are substantially equally sized and shaped, such Portions can be mass produced by cutting out of the initial sample portions with an automated or hand operated tool similar to a commonly used (but appropriately dimensioned) "cookie-cutter" that includes at least one of a cutout (producing an Individual Object Portion with the shape of the cutter's outline), detailed imprint (which may produce a marking on a surface of the Individual Object Portion), mould, press, or cutting sheet (that essentially has multiple cutout cutters mounted on to it). At step 540, the so-formed Individual Object Portions are positioned (either one by one or as a multitude, substantially simultaneously) onto the slide/holder/substrate that has been judiciously prepared and, optionally, shaped to define areas of the slide organized into a pattern as described above, to form an Object Array for further examination with the AM.

Figure 6:
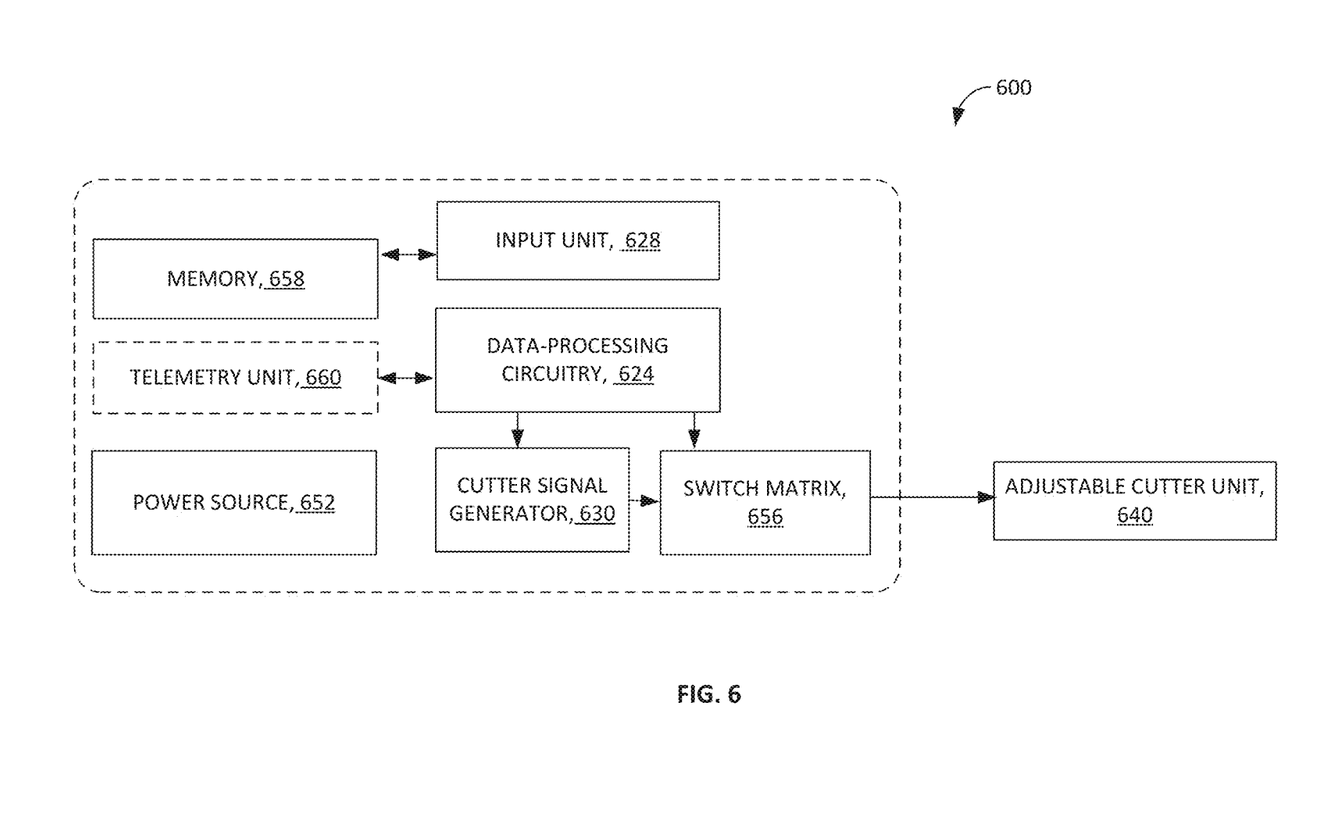
FIG. 6 is an embodiment of the system configured for forming an object array.

FIG. 6 provides a non-limiting example of the system 600 of the invention. The object-array forming system 600 of the invention may include the data-processing computer circuitry 624 programmed to calculate the parameters defining shape, dimensions, separations among the Individual Object Portions to be carved from the initial object based on input data representing opto-geometrical parameters of the AM (and received either from the input unit 628 such as a user interface circuitry or a tangible memory storage 658). The circuitry 624 is also programmed to activate a signal generator 630 to produce an electrical output (such as a current pulse, for example) that stimulates and governs the operation of the cutter unit 640 having cutting blade(s) that are spatially-adjustable (optionally—both in position and mutual orientation of blades) according to the calculated geometrical parameters of the Individual Object Portions. The circuitry 624 may be realized by one or more microprocessors, digital signal processors (DSPs), Application-Specific Integrated Circuits (ASIC), Field-Programmable Gate Arrays (FPGA), or other equivalent integrated or discrete logic circuitry. The system 600 may further include a switch matrix 656 to apply the output from the cutter signal generator 630 to the adjustable cutter unit to move, reposition the blade(s) of the cutter unit 640 with respect to the initial object disposed under the blade(s). across selected microcoils 116 or microcoil systems 616 within a single portion of the implant 14 or within two or more implant portions. Alternatively, the system 600 may include multiple signal generators 630, each coupled to and controlling given blade(s) of the cutter unit 640.

A tangible non-transitory computer-readable memory 658 may be provided to store instructions for execution by the circuitry 624 to control the signal generator 630 and the switch matrix 656. For example, the memory 158 may be used to store program codes defining different sets of geometrical parameters defining the repositioning of the blade(s) of the cutter unit 640 during the process of carving or separating the Individual Object Portions from the initial object. Other information relating to operation of the system 600 may also be stored thereon. The memory 658 may be random access memory (RAM), read-only memory (ROM), electronically programmable memory (EPROM or EEPROM), flash memory or any other memory, or combination thereof, suitable for storing control software or other instructions and data. Those skilled in the art should also readily appreciate that instructions or programs defining the functions of the present invention may be delivered to the data-processing circuitry 624 in many forms, including, but not limited to, information permanently stored on non-writable storage media such as devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

A telemetry unit 660 supporting wireless communication between the system 600 and an external programmer (not shown) is optionally provided. The data-processing circuitry 624 controls the telemetry unit 660 to receive programming information and send operational information. The wireless telemetry unit 660 may receive and send information via radio frequency (RF) communication or proximal inductive interaction of a programmer.

A power source 662 delivers operating power to the components of the system 600 including the cutter 640. The power source 662 may include a rechargeable or non-rechargeable battery or a power generation circuit to produce the operating power. In some embodiments, battery recharging may be accomplished through proximal inductive interaction between an external charger and an inductive charging coil (not shown) within the system 600.

It is appreciated that, when organizing the Object Array from the numerous Individual Object Portions, the precise location of such Individual Object Portions on an underlying carrying substrate or holder or microscope slide is important for correct imaging purposes and achieving better efficiency. If the position accuracy of Individual Object Portions is poor, then the Individual Object Portions must be significantly undersized (in comparison with the FOV of the individual objective of the AM defined in the object plane). The exact positioning tolerance of Individual Object Portions will depend on the geometry of the AM. For the AM geometry comparable to that of FIG. 2, an Individual Object Portion is preferably centered at a point within 10 microns from the corresponding nominal center point defined by the center of the corresponding objective's FOV.

Figure 7:
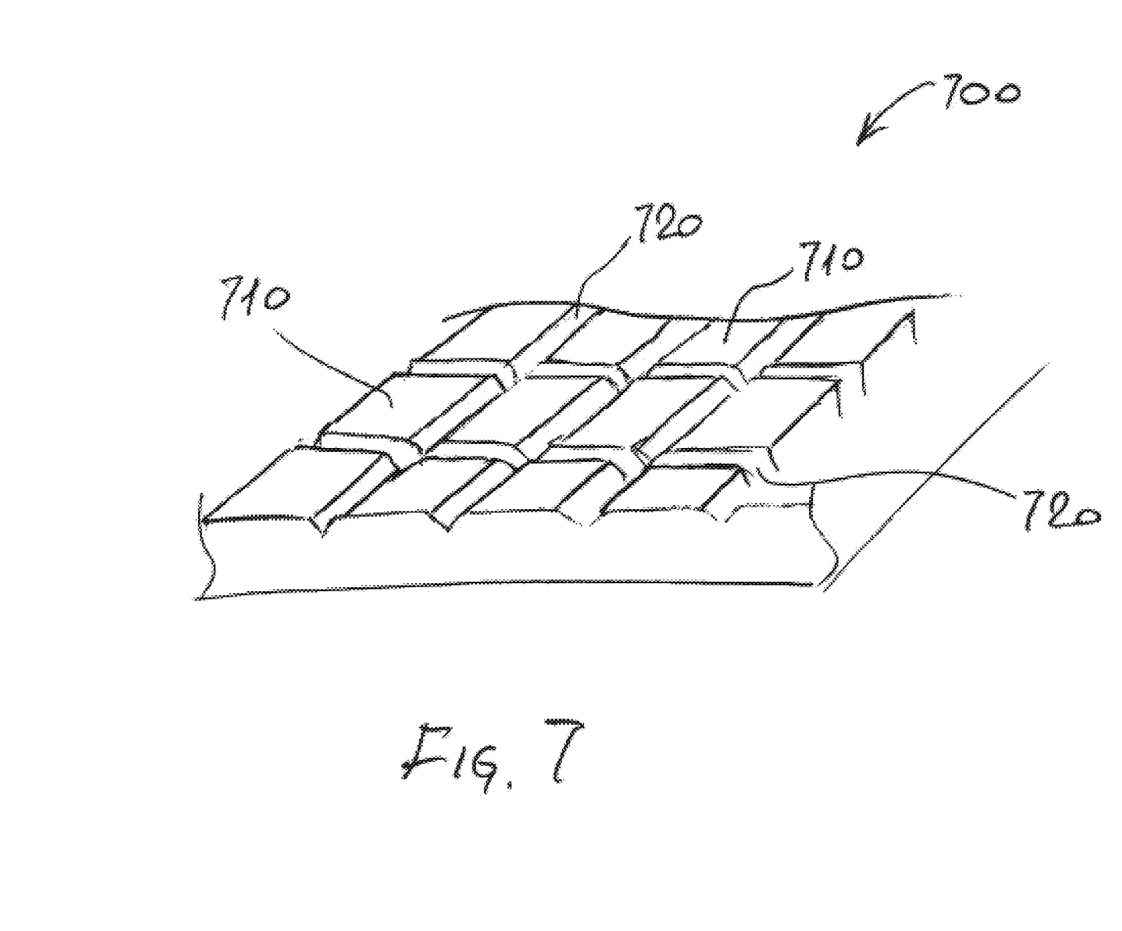
FIG. 7 is a diagram illustrating an object-holding support unit for use with an AM for imaging of an object array according to an embodiment of the invention.

An embodiment of the invention provides a method and device intended the facilitation of the positioning and mutual orientation of the Individual Object Portions on the carrying substrate or holder. According to an embodiment of the invention, a sample-carrying slide/substrate/holder is pre-printed or patterned (for example, by molding) with a set of visually-perceivable patterns to denote boundaries of areas or sections of such slide-substrate/holder at least some of which are dedicated to contain at least some of the Individual Object Portions. In one embodiment, for example, a microscope slide 700 can be molded from an optically-transparent plastic material having a surface relief that defines indentations identifying such individual areas of the microscope slide. The individual areas can be formed on the slide as protrusions 710 of pre-determined shape or positive surface relief, as shown schematically and not to scale in FIG. 7) surrounded with grooves 720; or, alternatively, indentations surrounded by ribs or ridges as boundaries around such indentations (negative surface relief, not shown). The spatial pattern defined by such individual areas of the sample-supporting substrate is judiciously defined to correspond to the pattern defined by a grid of the FOVs of the array of objectives of the AM, as discussed above. The definition of such pattern depends on the particular geometry of the AM. As an example, for one of existing AM systems, the spacings between neighboring objectives are approximately 2 mm, the FOV diameter in the object plane for each objective is approximately 0.25 mm and the transverse magnification is −7×. When depositing tissues sections or individual portions onto a pre-patterned slide to create an object array, each tissue section needs to be positioned within the boundary of the corresponding pre-printed pattern.

In a related embodiment of the invention, the AM-specific Object Array is formed with the use of a holder referred to as a well-plate. A well plate (microwell plate, more appropriately named a microtiter plate) is a flat plate with multiple depressions, or wells, that are typically used as small test tubes. The microplate has become a rather common tool in analytical research and clinical diagnostic testing laboratories (a very common usage is in the enzyme-linked immunosorbent assay). A microplate typically has 6, 24, 96, 384 or even 1536 sample wells arranged in a 2:3 rectangular matrix. Some microplates have even been manufactured with 3456 or even 9600 wells, and an "array tape" product has been developed that provides a continuous strip of microplates embossed on a flexible plastic tape. When used according to the teachings of related art, each well of a microplate typically holds somewhere between tens of nanoliters to several milliliters of liquid. Wells can be either circular or square. For compound storage applications, square wells with close fitting silicone cap-mats are preferred. Microplates can be stored at low temperatures for long periods, may be heated to increase the rate of solvent evaporation from their wells and can even be heat-sealed with foil or clear film.

Figure 8:
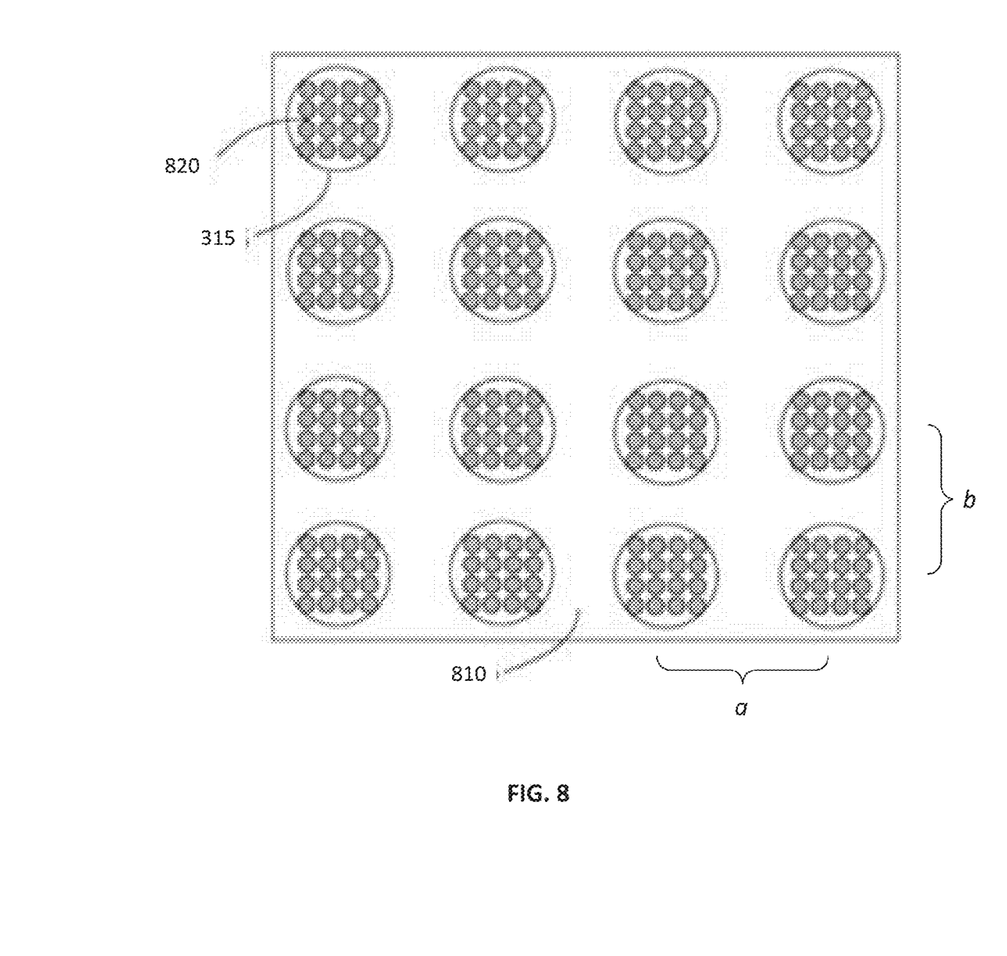
FIG. 8 is a top-view schematic of a well-plate for use with an AM according to an embodiment of the invention.

When a well-plate is used for imaging purposes in conjunction with standard fluorescence microscopes, only a limited number of individual wells can "fit" into the FOV of a fluorescence microscope objective at a time. As a result, the use of a well-plate with a microscope system of the related art inevitably requires extensive spatial scanning to image each well plate. According to an embodiment of the invention, the efficiency and operational throughput can be improved when the well-plate (structured such that the individual wells are disposed according to pattern parameters determined at step 530 of the algorithm of the invention based on the geometry of the AM system) and carrying or supporting the multitude of Individual Object Portions in the individual wells are used in conjunction with an Array Microscope (such as a fluorescent AM system, for example). A non-limiting example of an embodiment of a well plate for use with the AM of the invention is schematically shown in FIG. 8. Instead of a conventionally-used rectangular grid, the wells are arranged into an array 810 containing multiple grids 820. Each smaller grid 820 of wells is dimensioned to occupy an area within the bounds an Individual FOV 335 of an objective 310 of the embodiment of the AM. In this specific example, the spacings a, b between neighboring grids of wells directly correspond to those between objectives in the Array Microscope. This type of fluorescence well plate 810 can be imaged by an Array Microscope in one snapshot without scanning.

Figure 9:
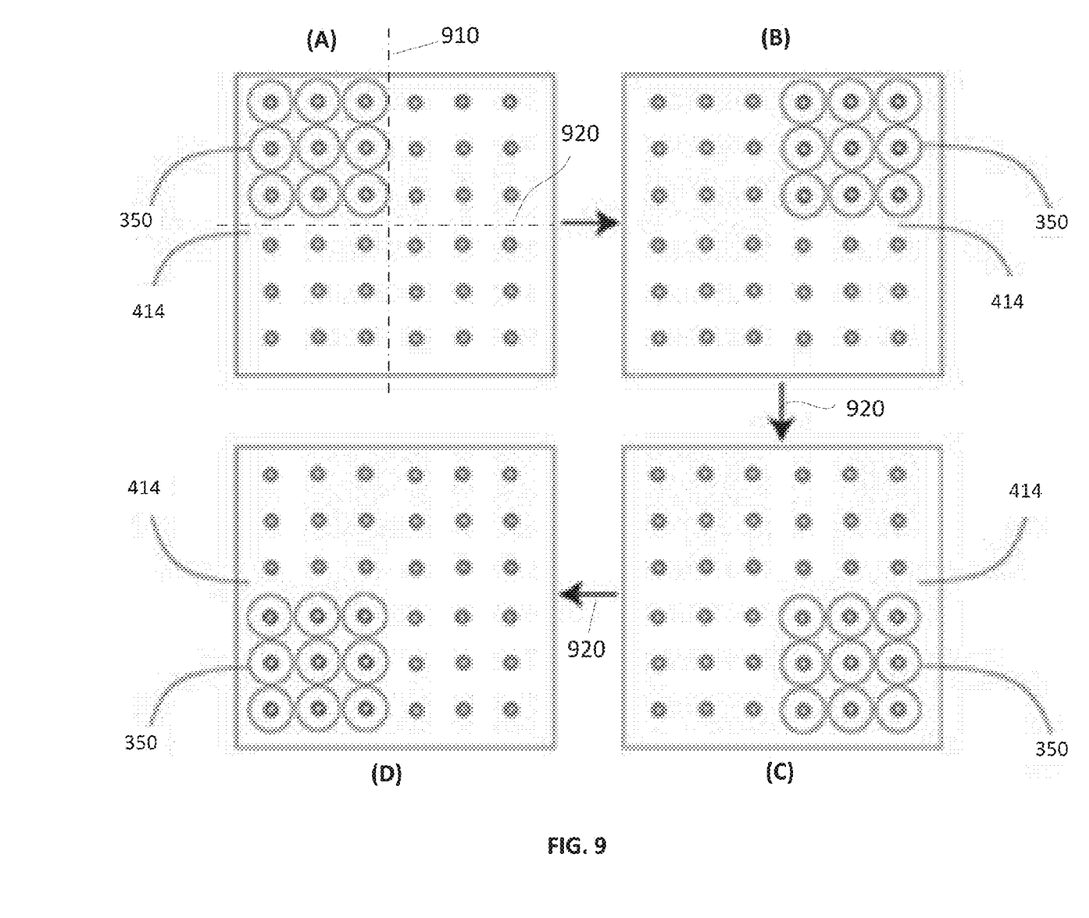
FIG. 9 is a schematic diagram illustrating an embodiment of imaging process of an object array with the AM of the invention according to step-and-go mode of scanning.

In one embodiment, the use of the Object Array matched in size and geometry with the arrayed imaging system completely eliminate the need for scanning. It is appreciated, however, that due to fabrication limitations, cost, and technical difficulty associated with the production of the Array Microscopes having very large arrays of objectives it may be more beneficial to limit, instead, the size of the array of objectives and still implement a limited amount of scanning. As a result, the geometrical extent of a given Object Array may sometimes exceed the geometrical extent of the array of objectives of the AM system. In such a case, the scanning portion of the imaging operation cannot be completely eliminated, and the Array Microscope will be used to perform step-and-go type of scanning, schematically referred to in the diagram of FIG. 9. Here, the illustration is provided of a particular pattern of scanning/translational operation of the Array Microscope 350 (of FIG. 3) that facilitates the imaging of the Object Array 414 of FIG. 4. In reference to lines 810, used to visually divide the array 414 into quadrants, the operation of the AM 350 may be initiated, for example, in a second quadrant as shown in FIG. 9A to snap-shot image Individual Object Portions disposed in the second quadrant of the array. Then, the AM is scanned/translated towards the first quadrant (FIG. 9B) for a second snap short, and so on (as shown with arrows 920—in a counterclockwise manner, to FIG. 9C, then to FIG. 9D). Generally, however, the scanning step is effectuated by laterally translating an AM over the Object Array and across a distance corresponding to the width of the Array Microscope system.

It is understood that the disclosed principle of reformatting and/or restructuring a traditional object that is physically divisible into multiple portions or sections into an Object Array and matching this Object Array geometry with Array Microscope geometry can be implemented for many modalities of microscopy including but not limited to: brightfield microscopy, fluorescence microscopy, confocal microscopy, dark field microscopy, phase contrast microscopy, and multi-photon microscopy. Care should be taken with respect to forming an Object Array from an initial object that contains extremely low-spatial-frequency features carrying the information that is critical for imaging and object assessment purposes and that could be reduced or lost due to formation of the Object Array. (One relevant example includes the imaging of a whole-brain section. In this case, it is often desired to preserve the entire cross section of the brain in one piece. Locations of different features relative to the entire cross section are important. In the case of the human brain, for example, the section can be dimensioned to be about 6 inches by 8 about inches.)

While the invention is described through the above-described exemplary embodiments, it will be understood by those of ordinary skill in the art that modifications to, and variations of, the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiment(s).

What is claimed is:

1. A method for preparation of a spatially-continuous object for imaging said object with an array microscope system, the method comprising:
    dividing said object into a plurality of individual object portions,
        wherein, in said object, a first individual object portion from said plurality is adjacent to a second individual object portion from said plurality;
        wherein a number of individual object portions in said plurality is defined by a number of objectives in said array microscope system;
        wherein individual object portions from said plurality are equally sized and shaped and a maximum dimension of each individual object portion does not exceed a field-of-view (FOV) of an objective, of said array microscope system, in an object plane of said array microscope system;
    positioning said plurality of individual object portions in said object plane in a spatial pattern defined by a pattern of an array of objectives of said array microscope system such that mutual orientation of neighboring individual object portions in said pattern is the same as mutual orientation of individual object portions in said object, and
    procuring an array of images of said individual object portions with the array microscope system in a single snap-shot to form a spatially-continuous artifact-free image of said object without scanning of the array microscope system and without a need to stitch images from said array of images.

2. The method according to claim 1, wherein the positioning includes positioning said formed individual object portions in said spatial pattern that is defined by a spatial grid defined by the array of objectives and magnification of the objectives of the array microscope system.

3. The method according to claim 1, further comprising separating individual object portions from the object using an automatic cutting tool.

4. The method according to claim 1, wherein the positioning includes positioning the individual object portions in an array of wells of a well-plate.

5. The method according to claim 1, wherein the positioning includes positioning the individual object portions onto a substrate having a lithographically-defined surface pattern.

6. The method according to claim 1, wherein the positioning includes positioning the individual object portions onto a substrate having an etched surface pattern.

7. The method according to claim 1, further comprising:
with a data-processing computer circuitry of said array microscope system, acquiring first data representing opto-geometrical parameters the said array microscope system; and
determining said spatial pattern based on said first data.

8. The method according to claim 7, wherein the acquiring includes acquiring of the first data that include at least one of (i) a geometrical dimension of said FOV; and (ii) a descriptor of said pattern of an array of objectives of said array microscope system formed by FOVs of said objectives in the object plane.

9. The method according to claim 7, wherein the determining said spatial pattern includes determining at least one of a spacing between the first and second individual object portions and a geometrical size of an individual object portion from said plurality.

\* \* \* \* \*